United States Patent [19]

Angeloff

[11] Patent Number: 4,590,718
[45] Date of Patent: May 27, 1986

[54] PORTABLE, ADJUSTABLE STRUCTURE AND METHOD OF ERECTING SAME

[75] Inventor: Lloyd G. Angeloff, North Merrick, N.Y.

[73] Assignee: Grumman Aerospace Corporation, Bethpage, N.Y.

[21] Appl. No.: 579,274

[22] Filed: Feb. 13, 1984

[51] Int. Cl.$^4$ .............................................. B66C 23/06
[52] U.S. Cl. .................................... 52/116; 52/745; 212/178
[58] Field of Search .............. 52/119, 120, 745, 116, 52/726, 152; 343/882; 212/178, 182, 195

[56] References Cited

U.S. PATENT DOCUMENTS

| | | | |
|---|---|---|---|
| 2,474,250 | 6/1949 | Howard | 52/120 X |
| 3,154,833 | 11/1964 | Kimball | 52/152 X |
| 3,827,197 | 8/1974 | Adam | 52/116 X |
| 3,977,139 | 8/1976 | Bryant | 52/116 |
| 4,214,665 | 7/1980 | Newman | 52/726 |

Primary Examiner—Carl D. Friedman
Attorney, Agent, or Firm—Richard G. Geib; Daniel J. Tick; Bernard S. Hoffman

[57] ABSTRACT

A portable, adjustable structure for supporting an equipment unit at a distance above a support surface has a lower tower structural member placed on the support surface. Pivot support structural members are affixed to the lower tower structural member in a manner whereby the pivot support structural members are upright relative to the support surface. A plurality of struts are utilized to stabilize the lower tower structural member and the pivot support structural members on the support surface. A tower member is pivotally mounted on the pivot support structural members. The tower member has spaced opposite first and second ends. The equipment unit is affixed to the tower member at the first end thereof. The tower member is pivotally movable to a position substantially perpendicular to the support surface with the first end thereof spaced farther from the support surface than the second end thereof. Ballast is affixed to the tower member at the second end thereof. The second end of the tower member is coupled to the lower tower structural member whereby the tower member is normally upright and is pivotable, upon uncoupling of the tower member and the lower tower structural member, to position the equipment unit close to the support surface for maintenance and repair.

16 Claims, 21 Drawing Figures

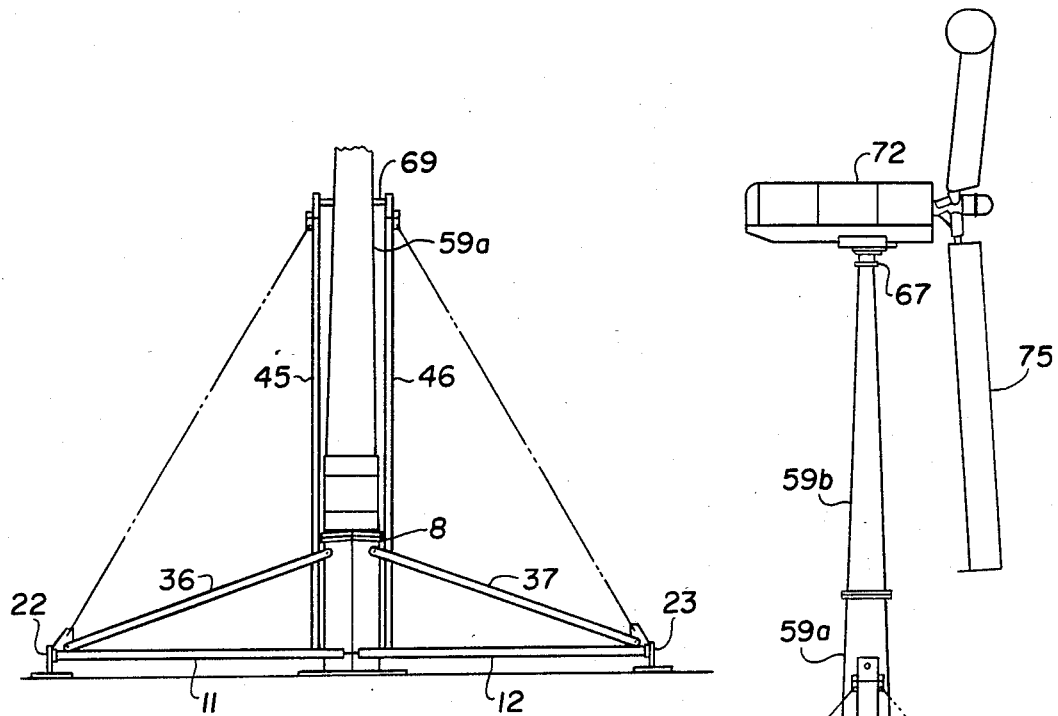
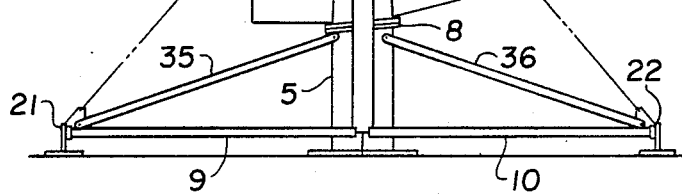
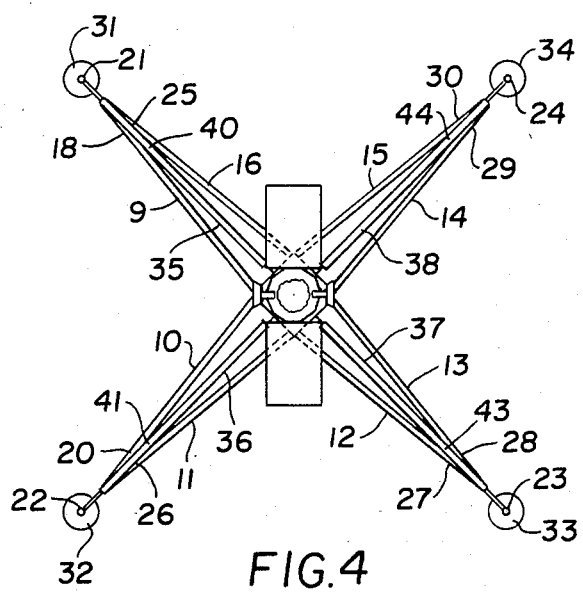

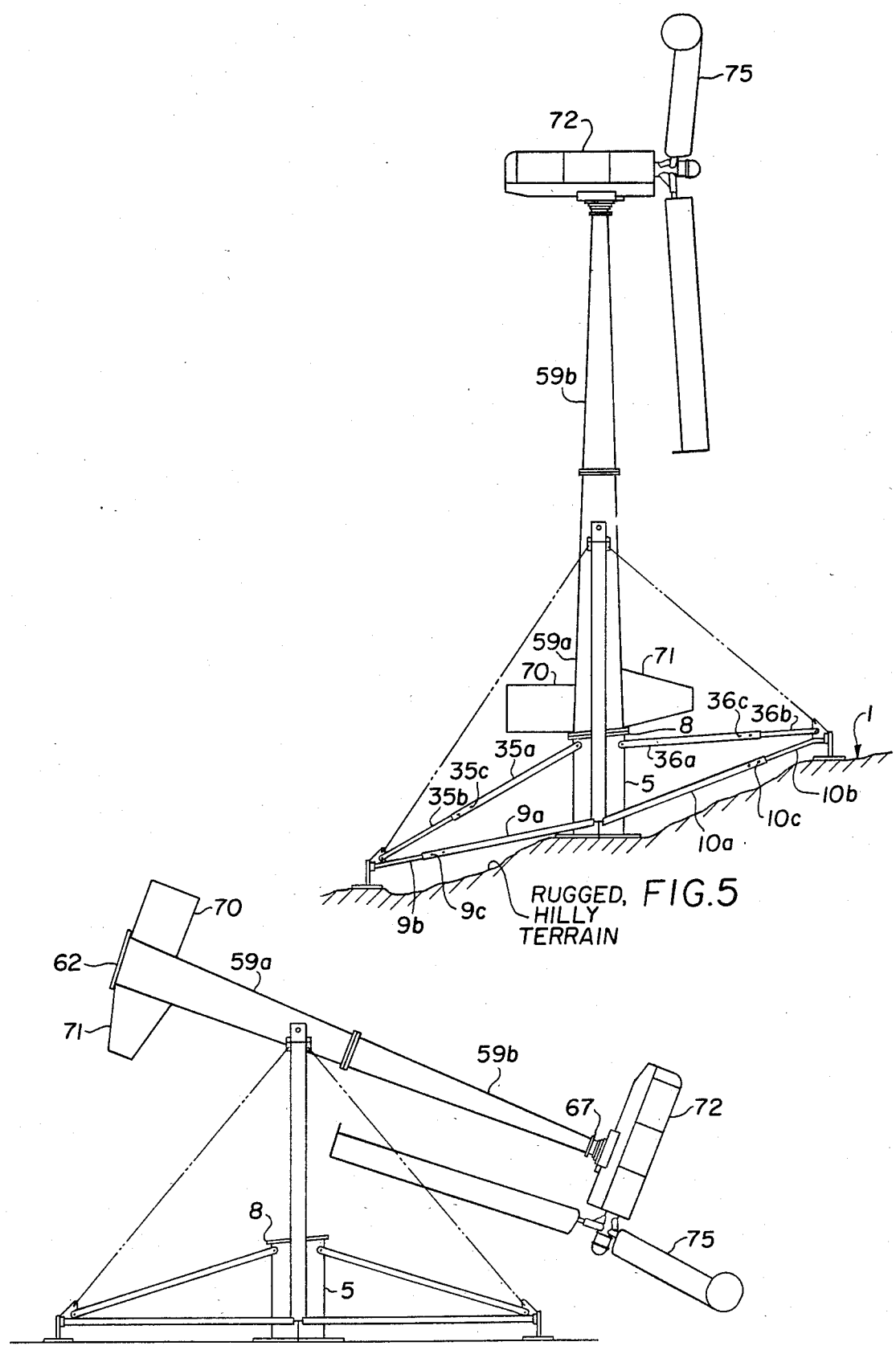

PORTABLE, ADJUSTABLE STRUCTURE AND METHOD OF ERECTING SAME

BACKGROUND OF THE INVENTION

The present invention relates to a portable, adjustable structure and a method of erecting same. More particularly, the invention relates to a portable, adjustable structure for supporting a wind turbine at a distance above a support surface and a method of erecting same.

A conventional tower installation such as, for example, for a wind turbine, consists of a tower permanently fixed to a foundation. The foundation is generally in an excavated cavity located below ground level. The cost of preparing a conventional foundation combined with the cost of placing the conventional tower on or in the foundation and the cost of installing the equipment unit or wind turbine on the tower constitute a major initial expense. In remote regions, this installation cost can equal or exceed the cost of the equipment unit or wind turbine generator itself. As a result, mounting of any type of equipment or the exploitation of wind energy can become unnecessarily prohibitive. This is especially true in many remote regions that can only be best served by wind power energy.

Another disadvantage of a conventional tower installation is that access to the equipment unit or wind turbine becomes difficult and often dangerous. Maintenance can only be performed from a manlift or from a platform at hazardous heights. Major repairs generally require a large crane to place the equipment unit or wind turbine at ground level.

Still another disadvantage of a conventional tower is that an in-ground foundation in bedrock, permafrost, or a high water table becomes either impossible or extremely expensive. This disadvantage severely limits the economic viability of wind turbines in many areas endowed with abundant wind power, such as mountain tops, sea shores and arctic regions.

The principal object of the invention is to provide a method of erecting a structure, which method reduces the time and cost required to install such structure and an equipment unit mounted thereon.

An object of the invention is to provide a method of erecting a portable, adjustable structure, which method reduces the time and cost of installation of such structure and an equipment unit thereon by eliminating the need for site evacuation, concrete work, use of a crane, use of a manlift, use of field welding equipment and a large crew of skilled and semi-skilled workers.

Another object of the invention is to provide a method of erecting a portable, adjustable structure using a few relatively unskilled men and eliminating the need for a foundation or excavation.

Still another object of the invention is to provide a method of erecting a structure and mounting an equipment unit thereon, which method uses a few workers and permits maintenance and repair of the equipment unit mounted on the structure with safety, convenience and rapidity and without the need for disassembly, use of a crane or the like, a manlift or operations at a hazardous height above the ground.

Yet another object of the invention is to provide a method of erecting a portable, adjustable structure and mounting an equipment unit thereon, which method permits installation on sites where excavation and in-ground foundations are impracticable due to adverse soil conditions such as permafrost, high water table, bedrock, and so on.

Another object of the invention is to provide a method of erecting a portable, adjustable structure and mounting an equipment unit thereon, which method permits installation on existing structures without alteration to or damage of such structures.

Still another object of the invention is to provide a method of erecting a wind turbine structure, which method reduces the time and cost required to install such structure and a wind turbine mounted thereon.

Yet another object of the invention is to provide a method of erecting a portable, adjustable wind turbine structure, which method reduces the time and cost of installation of such structure and a wind turbine thereon by eliminating the need for site evacuation, concrete work, use of a crane, use of a manlift, use of field welding equipment and a large crew of skilled and semi-skilled workers.

Another object of the invention is to provide a method of erecting a portable, adjustable wind turbine structure using a few relatively unskilled men and eliminating the need for a foundation or excavation.

Still another object of the invention is to provide a method of erecting a wind turbine structure and mounting a wind turbine thereon, which method uses a few workers and permits maintenance and repair of the wind turbine mounted on the structure with safety, convenience and rapidity and without the need for disassembly, use of a crane or the like, a manlift or operations at a hazardous height above the ground.

Yet another object of the invention is to provide a method of erecting a portable, adjustable wind turbine structure and mounting a wind turbine thereon, which method permits installation on sites where excavation and in-ground foundations are impracticable due to adverse soil conditions such as permafrost, high water table, bedrock, and so on.

Another object of the invention is to provide a method of erecting a portable, adjustable wind turbine structure and mounting a wind turbine thereon, which method permits installation on existing structures without alteration to or damage of such structures.

Still another object of the invention is to provide a structure and an equipment unit mounted thereon, which structure is of reduced cost and is installable in a reduced time.

Yet another object of the invention is to provide a portable, adjustable structure and an equipment unit mounted thereon, which structure is of reduced cost and is installable in a reduced time due to elimination of the need for site evacuation, concrete work, use of a crane, use of a manlift, use of field welding equipment and a large crew of skilled and semi-skilled workers.

Another object of the invention is to provide a portable, adjustable structure which may be assembled by a few relatively unskilled men, without the need for a foundation or excavation.

Still another object of the invention is to provide a structure and an equipment unit mounted thereon, which structure may be assembled by a few workers and permits maintenance and repair of the equipment unit mounted on the structure with safety, convenience and rapidity and without the need for disassembly, use of a crane or the like, a manlift or operations at a height hazardous above the ground.

Yet another object of the invention is to provide a a portable, adjustable structure and an equipment unit mounted thereon, which structure may be installed on sites where excavation and in-ground foundations are impracticable due to adverse soil conditions such as permafrost, high water table, bedrock, and so on.

Another object of the invention is to provide a portable, adjustable structure and an equipment unit mounted thereon, which structure may be installed on existing structures without alteration to or damage of such structures.

Still another object of the invention is to provide a structure and a wind turbine mounted thereon, which structure is of reduced cost and is installable in a reduced time.

Yet another object of the invention is to provide a portable, adjustable structure and a wind turbine mounted thereon, which structure is of reduced cost and is installable in a reduced time due to elimination of the need for site evacuation, concrete work, use of a crane, use of a manlift, use of field welding equipment and a large crew of skilled and semi-skilled workers.

Another object of the invention is to provide a portable, adjustable wind turbine structure which may be assembled by a few relatively unskilled men, without the need for a foundation or excavation.

Still another object of the invention is to provide a structure and a wind turbine mounted thereon, which structure may be assembled by a few workers and permits maintenance and repair of the wind turbine mounted on the structure with safety, convenience and rapidity and without the need for disassembly, use of a crane or the like, a manlift or operations at a hazardous height above the ground.

Yet another object of the invention is to provide a portable, adjustable structure and a wind turbine mounted thereon, which structure may be installed on sites where excavation and in-ground foundations are impracticable due to adverse soil conditions such as permafrost, high water table, bedrock, and so on.

Another object of the invention is to provide a portable, adjustable structure and a wind turbine mounted thereon, which structure may be installed on existing structures without alteration to or damage of such structures.

BRIEF SUMMARY OF THE INVENTION

In accordance with the invention, a method of erecting a portable, adjustable structure having a plurality of structural members for supporting equipment at a distance above a support surface, comprises the steps of placing initial ones of the structural members on the support surface. Additional ones of the structural members are affixed to the initial ones of the structural members. The ones of the structural members include structural members which are upright relative to the support surface. The structure on the support surface is stabilized. An equipment support structural member is assembled. The equipment support structural member is pivotally mounted on the additional ones of the structural members. The equipment support structural member have spaced opposite first and second ends. Ballast is affixed to the equipment support structural member at the second end thereof. The equipment is affixed to the equipment support structural member at the first end thereof. The equipment support structural member is pivotally moved to a position substantially perpendicular to the support surface with the first end thereof spaced farther from the support surface than the second end thereof. The second end of the equipment support structural member is affixed to the initial ones of the structural members whereby the equipment support structural member is normally upright and is pivotable, upon unfastening of the second end from the additional ones of the structural members, to position the equipment close to the support surface for maintenance and repair.

The equipment support structural member is assembled from a lower equipment support structural member and an upper equipment support structural member coupled to the lower equipment support structural member. The equipment support structural member is pivotally mounted on the additional ones of the structural members at the lower equipment support structural member.

The ballast is affixed to the equipment support structural member by mounting ballast containers on opposite sides of the equipment support structural member at the second end thereof and filling the ballast containers with ballast.

In accordance with the invention, a portable, adjustable structure for supporting equipment at a distance above a support surface, the structure having a plurality of structural members, comprises initial ones of the structural members placed on the support surface. Additional ones of the structural members are affixed to the initial ones of the structural members. The ones of the structural members include structural members which are upright relative to the support surface. Stabilizing means is provided for stabilizing the structure on the support surface. An equipment support structural member is pivotally mounted on the additional ones of the structural members. The equipment support structural member has spaced opposite first and second ends. The equipment is affixed to the equipment support structural member at the first end thereof. The equipment support structural member is pivotally movable to a position substantially perpendicular to the support surface with the first end thereof spaced farther from the support surface than the second end thereof. Ballast means is affixed to the equipment support structural member at the second end thereof. Affixing means is provided for affixing the second end of the equipment support structural member to the initial ones of the structural members whereby the equipment support structural member is normally upright and is pivotable, upon unfastening of the affixing means, to position the equipment close to the support surface for maintenance and repair.

The equipment support structural member comprises a lower equipment support structural member and an upper equipment support structural member coupled to the lower equipment support structural member. The equipment support structural member is pivotally mounted on the additional ones of the structural members at the lower equipment support structural member.

The ballast means comprises ballast containers mounted on opposite sides of the equipment support structural member at the second end thereof.

The initial ones of the structural members include a lower tower structural member placed on the support surface. The additional ones of the structural members include a pair of spaced substantially parallel pivot support structural members affixed to opposite sides of the lower tower structural member and extending substantially perpendicularly to the support surface.

The stabilizing means includes lower struts having spaced opposite first and second ends. The first ends of the lower struts are affixed to, and the lower struts extend substantially radially from, the lower tower structural member. Each of a plurality of screw jacks, is mounted on the second end of a corresponding one of the lower struts. Each of a plurality of foot pads is affixed to a corresponding one of the jacks and placed on the support surface.

The lower tower structural member has a lower part and a spaced opposite upper part. The lower struts are affixed to the lower tower structural member at the lower part. The stabilizing means further includes upper struts having spaced opposite first and second ends. The first ends of the upper struts are affixed to, and the upper struts extend substantially radially from, the upper part of the lower tower structural member. The second end of each of the upper struts is affixed to corresponding ones of the lower struts.

The affixing means comprises a flange at the second end of the equipment support structural member and a flange at the upper part of the lower tower structural member. The flanges have aligned holes formed therethrough for accommodating fastening components.

Each of the lower and upper struts comprises a pair of telescoping strut members and means for fixing the strut members at a desired position relative to each other thereby providing adjustability of the length of each of the struts.

In accordance with the invention, a portable, adjustable structure for supporting a wind turbine at a distance above a support surface, the structure having a plurality of structural members, comprises a lower tower structural member placed on the support surface. Pivot support structural members are affixed to the lower tower structural member in a manner whereby the pivot support structural members are upright relative to the support surface. Stabilizing means is provided for stabilizing the lower tower structural member and the pivot support structural members on the support surface. A tower member is pivotally mounted on the pivot support structural members. The tower member has spaced opposite first and second ends. The wind turbine is affixed to the tower member at the first end thereof. The tower member is pivotally movable to a position substantially perpendicular to the support surface with the first end thereof spaced farther from the support surface than the second end thereof. Ballast means is affixed to the tower member at the second end thereof. Coupling means is provided for coupling the second end of the tower member to the lower tower structural member whereby the tower member is normally upright and is pivotable, upon uncoupling of the coupling means, to position the wind turbine close to the support surface for maintenance and repair.

The tower member comprises a lower tower section and an upper tower section coupled to the lower tower section. The tower member is pivotally mounted on the pivot support structural members at the lower tower section.

The ballast means comprises ballast containers mounted on opposite sides of the tower member at the second end thereof.

The pivot support structural members are in spaced substantially parallel relation and are affixed to opposite sides of the lower tower structural member and extend substantially perpendicularly to the support surface.

The stabilizing means includes lower struts having spaced opposite first and second ends. The first ends of the lower struts are affixed to, and the lower struts extend substantially radially from, the lower tower structural member. Each of a plurality of screw jacks is mounted on the second end of a corresponding one of the lower struts. Each of a plurality of foot pads is affixed to a corresponding one of the jacks and placed on the support surface.

The lower tower structural member has a lower part and a spaced opposite upper part. The lower struts are affixed to the lower tower structural member at the lower part. The stabilizing means further includes upper struts having spaced opposite first and second ends. The first ends of the upper struts are affixed to, and the upper struts extend substantially radially from, the upper part of the lower tower structural member. The second end of each of the upper struts is affixed to corresponding ones of the lower struts.

The coupling means comprises a flange at the second end of the tower member and a flange at the upper part of the lower tower structural member. The flanges have aligned holes formed therethrough for accommodating coupling components.

Each of the lower and upper struts comprises a pair of telescoping strut members and means for fixing the strut members at a desired position relative to each other thereby providing adjustability of the length of each of the struts.

BRIEF DESCRIPTION OF THE DRAWINGS

In order that the invention may be readily carried into effect, it will now be described with reference to the accompanying drawings, wherein:

FIG. 2 is a side view of an embodiment of the portable, adjustable structure of the invention, fully assembled and in operable condition;

FIG. 3 is a front view of part of the embodiment of the structure of FIG. 2;

FIG. 4 is a top view of the part of the structure of FIG. 3;

FIG. 5 is a side view of the embodiment of FIG. 2 in operable condition on irregular hilly terrain; and FIG. 6 is a side view of the structure of the invention with a wind turbine mounted thereon, in position for the mounting of the blades of the turbine.

DETAILED DESCRIPTION OF THE PREFERRED EMBODIMENT

Although the invention relates to a structure for supporting any suitable type of equipment unit such as, for example, an antenna for transmitting and/or receiving signals in the atmosphere and/or in space, a battery of lights, a battery of cameras, etc., it is described herein as supporting a wind turbine.

In accordance with the invention, the structure is erected by a method involving the following steps.

Figure 1A:
FIGS. 1A to 1H, 1J to 1N and 1P to 1R are schematic diagrams illustrating the steps of the method of the invention for erecting a portable, adjustable structure.

As shown in FIG. 1A, a support surface 1 of soil, for example, is levelled at a location 2, at which a lower tower structural member will be placed, and at locations 3 and 4, at which foot pads will be placed, as hereinafter described.

Figure 1B:
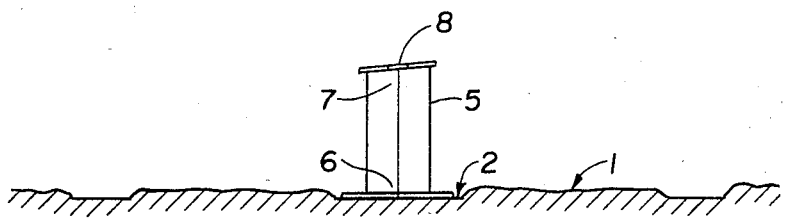

As shown in FIG. 1B, a lower tower structural member 5 is placed on the levelled area 2 of the support surface 1. The lower tower structural member 5 has a lower part 6, a spaced opposite upper part 7 and a flange 8 provided at said upper part, as shown in FIG. 1B, with a plurality of spaced holes formed through said flange.

Figure 1C:
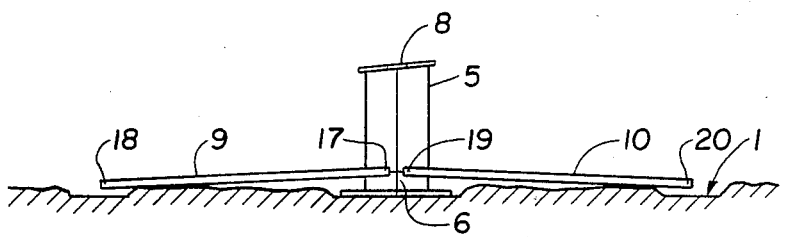
Figure 1D:
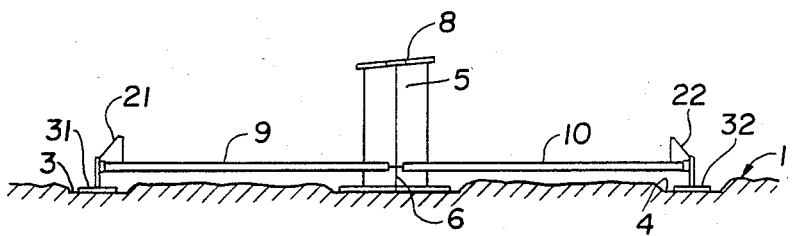

As shown in FIG. 1C, the lower tower structural member 5 is stabilized by a plurality of lower struts 9, 10, 11, 12, 13, 14, 15 and 16 (FIG. 4) of which only the lower struts 9 and 10 are shown in FIGS. 1C to 1E, 1G, 1J to 1N and 1P to 1R. Each of the lower struts 9 to 16 has spaced opposite first and second ends, of which only the first and second ends 17 and 18 of the lower strut 9 and the first and second ends 19 and 20 of the lower strut 10 are shown in FIG. 1C. The first ends 17 and 19 of the lower struts 9 and 10, respectively, are affixed to the lower tower structural member 5 (FIG. 1C) and said struts extend substantially radially from said lower tower structural member, as shown in FIG. 4. The pairs of lower struts 9, 16 and 10, 11 and 12, 13 and 14, 15 are equiangularly spaced from each other by approximately 90°.

A plurality of screw jacks 21, 22, 23 and 24 are provided, as shown in FIG. 4. The screw jack 21 is mounted on the second ends 18 and 25 of the lower struts 9 and 16, respectively, the screw jack 22, is mounted on the second ends 20 and 26 of the lower struts 10 and 11, respectively, the screw jack 23 is mounted on the second ends 27 and 28 of the lower struts 12 and 13, respectively, and the screw jack 24 is mounted on the second ends 29 and 30 of the lower struts 14 and 15, respectively, as shown in FIG. 4.

A plurality of foot pads, 31, 32, 33 and 34 are provided, as shown in FIG. 4. The foot pad 31 is affixed to the jack 21 and placed on the support surface 1 in the levelled area 3 (FIG. 1D), the foot pad 32 is affixed to the jack 22 and placed on said support surface in the levelled area 4 (FIG. 1D), the foot pad 33 is affixed to the jack 23 and placed in a levelled area of said support surface and the foot pad 34 is affixed to the jack 24 and placed in a levelled area of said support surface, as shown in FIG. 4.

Figure 1E:
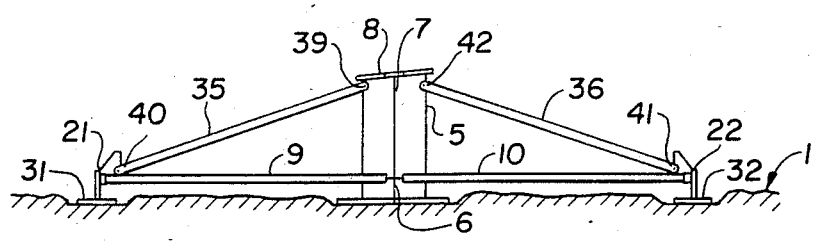

The lower struts 9 to 16 are affixed to the lower tower structural member 5 at its lower part 6, as shown in FIG. 1E. As shown in FIG. 1E, the lower tower structural member 5 is further stabilized by a plurality of upper struts 35, 36, 37 and 38 (FIG. 4), of which only the upper struts 35 and 36 are shown in FIGS. 1E, 1G, 1J to 1N and 1P to 1R. Each of the upper struts 35 to 38 has spaced opposite first and second ends, of which only the first and second ends 39 and 40 of the upper strut 35 and the first and second ends 42 and 41 of the upper strut 36 are shown in FIG. 1E. The first ends 39 and 42 of the upper struts 35 and 36, respectively, are affixed to the upper part 7 of the lower tower structural member 5 (FIG. 1E) and said struts extend substantially radially from said lower tower structural member, as shown in FIG. 4. The upper struts 35 to 38 are equiangularly spaced from each other by approximately 90°.

The second end 40 of the upper strut 35 is affixed to the second ends 18 and 25 of the lower struts 9 and 16, respectively, in common, the second end 41 of the upper strut 36 is affixed to the second ends 20 and 26 of the lower struts 10 and 11, respectively, in common, the second end 43 of the upper strut 37 is affixed to the second ends 27 and 28 of the lower struts 12 and 13, respectively, in common, and the second end 44 of the upper strut 38 is affixed to the second ends 29 and 30 of the lower struts 14 and 15, respectively, in common, as shown in FIG. 4.

The screw jacks 21 to 24 are adjusted to align the bolt holes in the corresponding lower and upper struts to facilitate affixing thereof, as hereinbefore described.

Figure 1F:
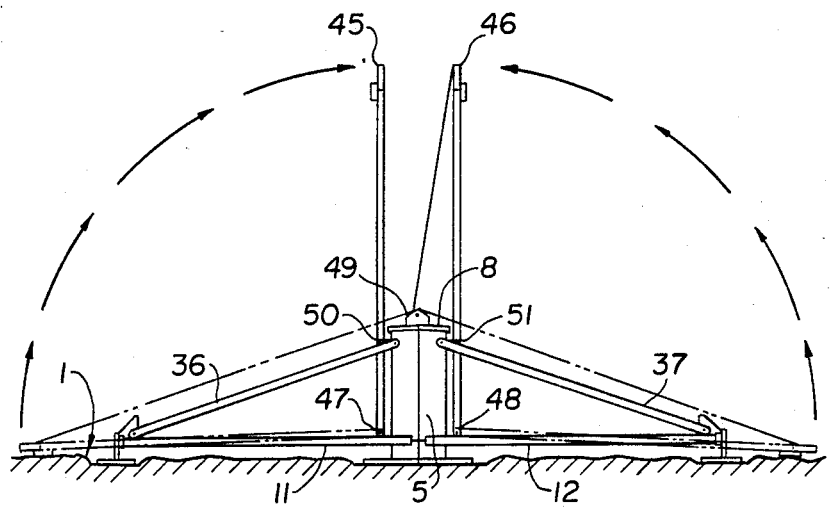

Pivot support structural members 45 and 46 are then affixed to the lower tower structural member 5 in a manner whereby said pivot support structural members are upright relative to the support surface 1, as shown in FIG. 1F. This may be accomplished in any suitable manner such as, for example, by first placing the pivot support structural members 45 and 46 on the support surface 1. The lower ends of the members 45 and 46 are then lifted and affixed to the lower tower structural member 5 via rigging pins 47 and 48, respectively (FIG. 1F). A portable hoist or winch 49 may then be affixed to the flange 8 of the lower tower structural member 5 and the pivot support structural members 45 and 46 are hoisted to a vertical position, using the rigging pins 47 and 48 as pivots. The pivot support structural members 45 and 46 are then bolted, or otherwise suitably affixed, to the lower tower structural member 5 at the point where the rigging pin 47 was and a point 50 in the upper part 7 of said lower tower structural member, and at the point where the rigging pin 48 was and a point 51 in the upper part 7 of said lower tower structural member.

Figure 1G:
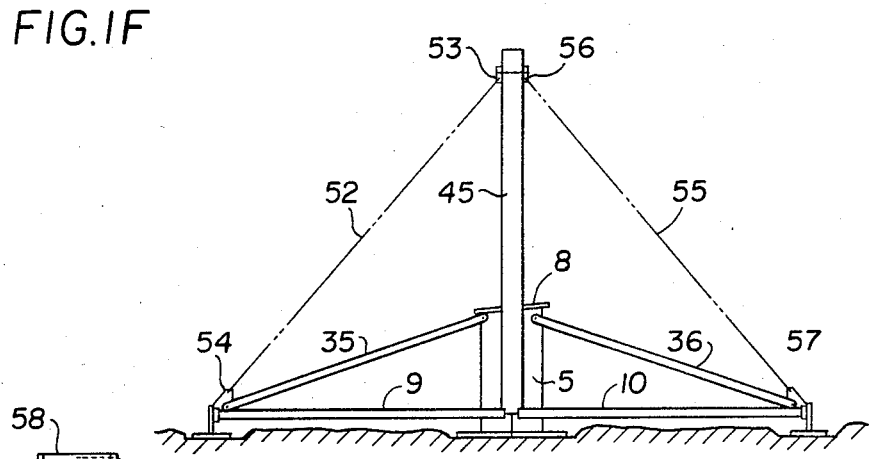

A pivot support guy 52 for the pivot support structural member 45 is bolted at one end to said pivot support structural member at a point 53 and at its spaced opposite end to the common connection 54 of the lower struts 9 and 16 and the upper strut 35 (FIG. 1G). A pivot support guy 55 for the pivot support structural member 45 is bolted at one end to said pivot support structural member at a point 56 and at its spaced opposite end to the common connection 57 of the lower struts 10 and 11 and the upper strut 36 (FIG. 1G). The pivot support structural member 46 is stabilized by a plurality of guys (not shown in the FIGS.) affixed in the same manner as for the member 45.

Figure 1H:
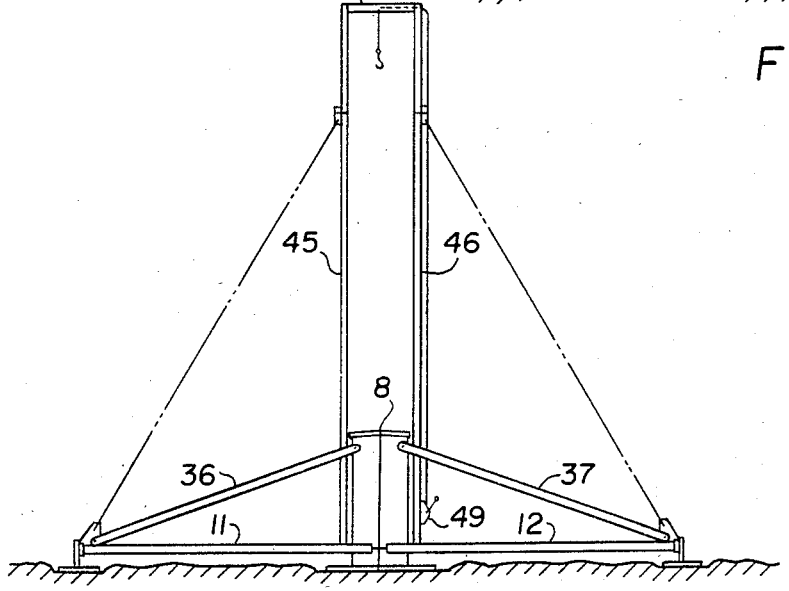

The winch 49 is then removed from the flange 8 and is affixed to the pivot support structural member 46 at the bottom thereof, as shown in FIG. 1H. A pulley frame 58 is affixed to the tops of the pivot support structural members 45 and 46, as shown in FIG. 1H. The pulley frame 58 and the winch 49 are used to assist in pivotally mounting a tower member 59a, 59b on the pivot support structural members 45 and 46. The tower member 59a, 59b consists of a lower tower section 59a (FIGS. 1J to 1N and 1P to 1R) and an upper tower section 59b (FIGS. 1K to 1N and 1P to 1R) coupled to said lower tower section.

Figure 1J:
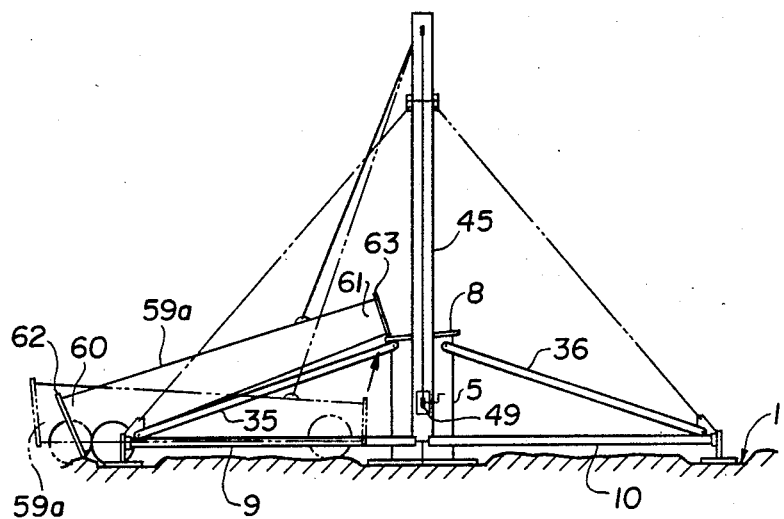
Figure 1K:
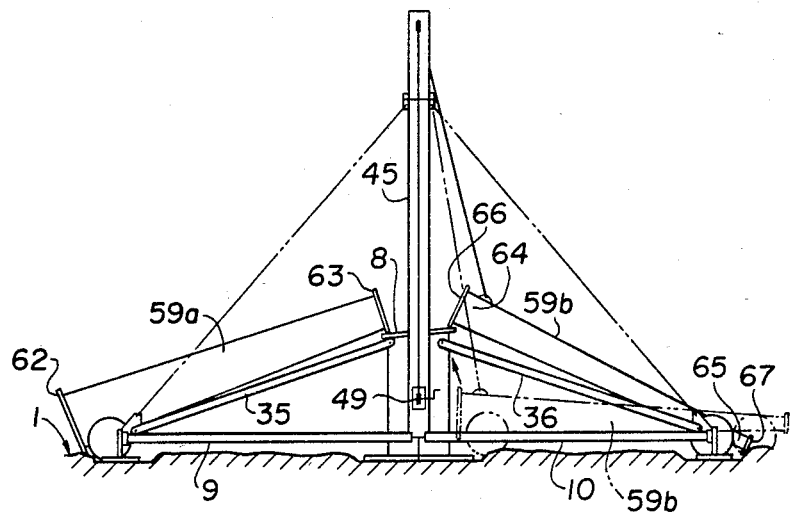

The lower tower section 59a has spaced opposite bottom and top ends 60 and 61, respectively, with a bottom flange 62 at its bottom end and a top flange 63 at its top end, as shown in FIG. 1J. The lower tower section 59a is raised so that its top flange 63 rests on the flange 8 of the lower tower structural member 5 and its bottom flange 62 rests on the support surface 1 (FIGS. 1J and 1K). The upper tower section 59b has spaced opposite bottom and top ends 64 and 65, respectively, with a bottom flange 66 at its bottom end and a top flange 67 at its top end, as shown in FIG. 1K. The upper tower section 59b is raised so that its bottom flange 66 rests on the flange 8 of the lower tower structural member and its top flange 67 rests on the support surface 1 (FIG. 1K).

Figure 1L:
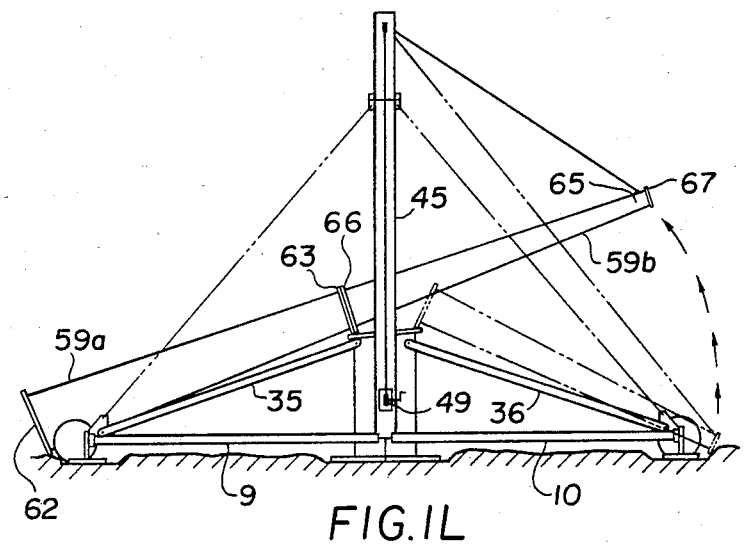

The top end 65 of the upper tower section 59b is raised so that the lower tower section 59a and said upper tower section 59b are coaxially aligned and the top flange 63 of said lower tower section abuts, and is aligned with, the bottom flange 66 of said upper tower section. The upper tower section 59b is then bolted to the lower tower section 59a via their flanges 66 and 63, respectively, as shown in FIG. 1L. A pivot pin hole 68 is formed through the lower tower section 59a (FIG. 1M).

Figure 1M:
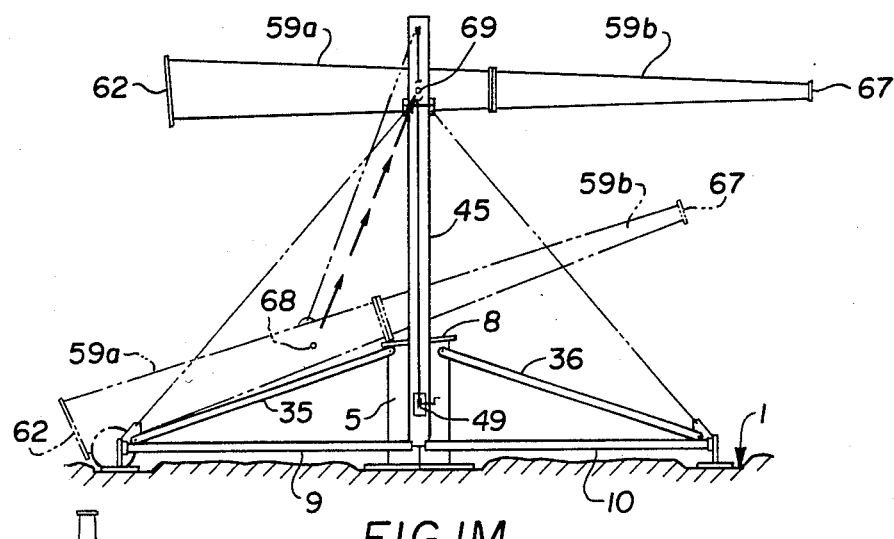

The tower member 59a, 59b is raised until the pivot pin hole 68 is aligned with a pivot pin 69 which is inserted through said pivot pin hole and extends between the pivot support structural members 45 and 46 (FIGS. 1M and 3). The pivot pin 69 is located at the center of gravity of the tower member 59a, 59b, so that said tower member may easily be retained in any desired position or rotated to any desired position with the aid of guy ropes. The pulley frame 58 (FIG. 1H) is then removed.

Figure 1N:
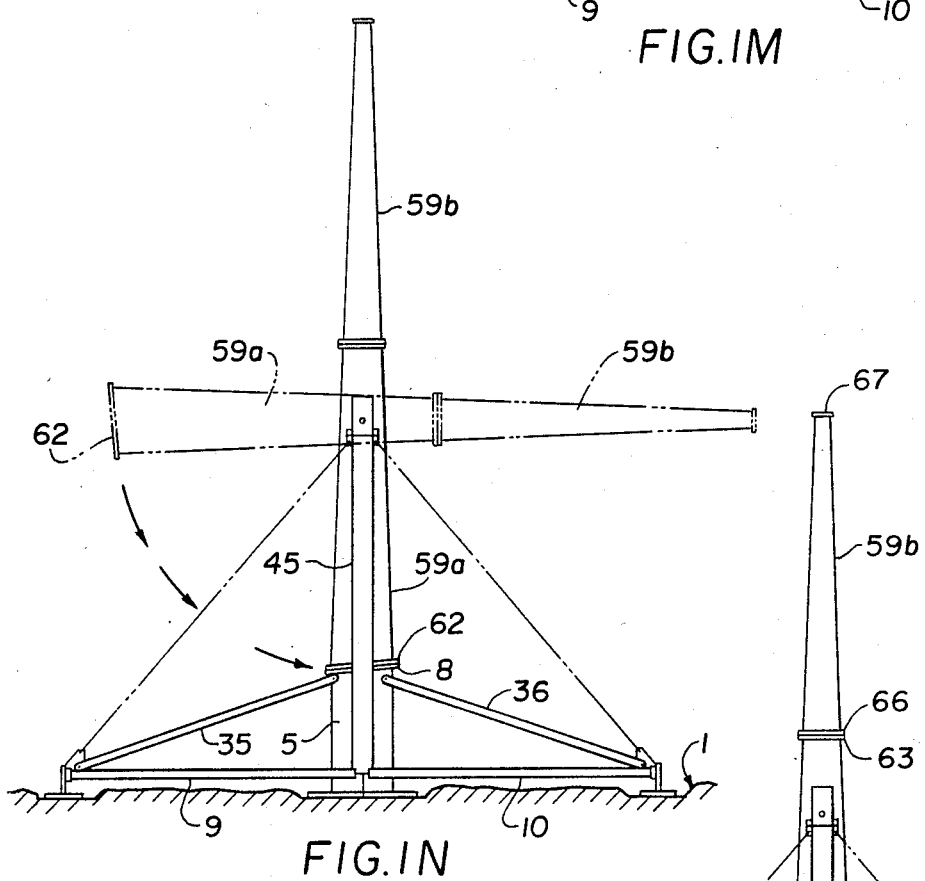

The tower member 59a, 59b is pivotally moved or rotated about the pivot pin 69 to a substantially vertical position, which is substantially perpendicular to the support surface 1, as shown in FIG. 1N, so that said tower member is coaxially aligned with the lower tower structural member 5 and the bottom flange 62 of said tower member abuts, and is aligned with, the flange 8 of said lower tower structural member. The tower member 59a, 59b is then bolted to the lower tower structural member 5 via their flanges 62 and 8, respectively, as shown in FIG. 1N.

Figure 1P:
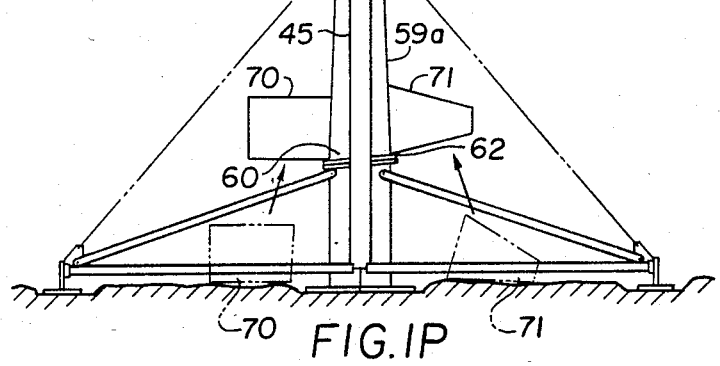

Ballast containers 70 and 71 are affixed to the tower member 59a, 59b in the area of its bottom end 60, preferably just above the bottom flange 62 of said tower member (FIG. 1P). The ballast containers 70 and 71 are mounted on opposite sides of the tower member 59a, 59b, as shown in FIG. 1P, by any suitable means such as, for example, bolting. The ballast containers 70 and 71 are then filled with ballast, which may be any specified quantity of local soil, rocks, water, or the like.

Figure 1Q:
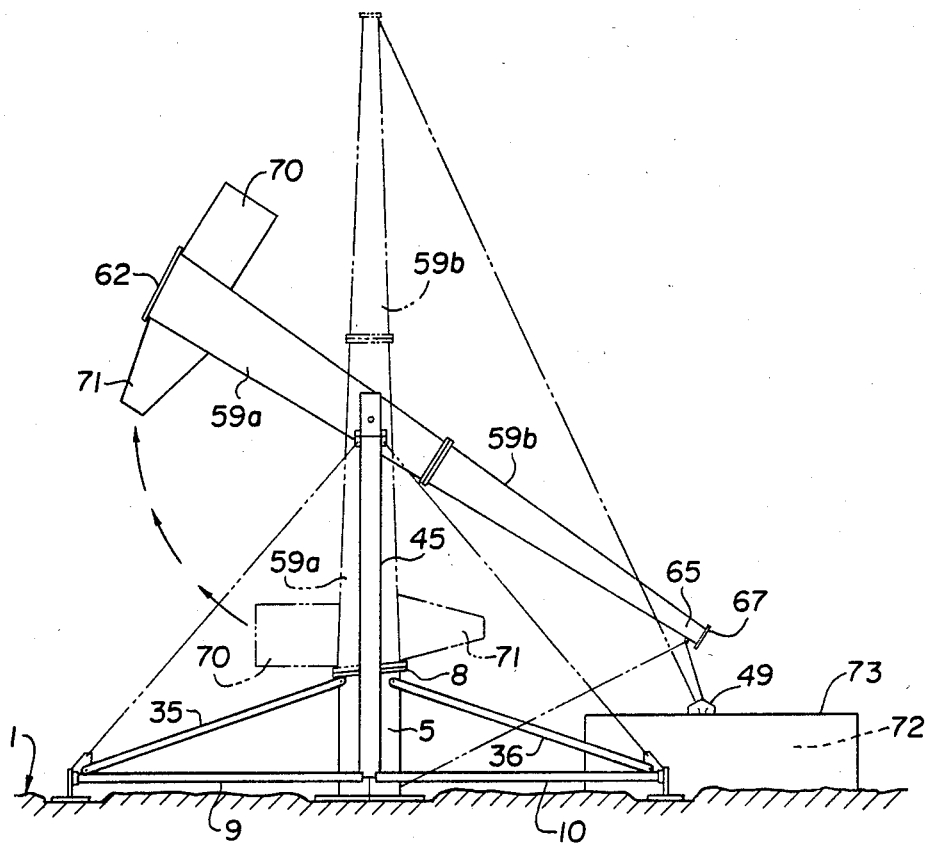
Figure 1R:
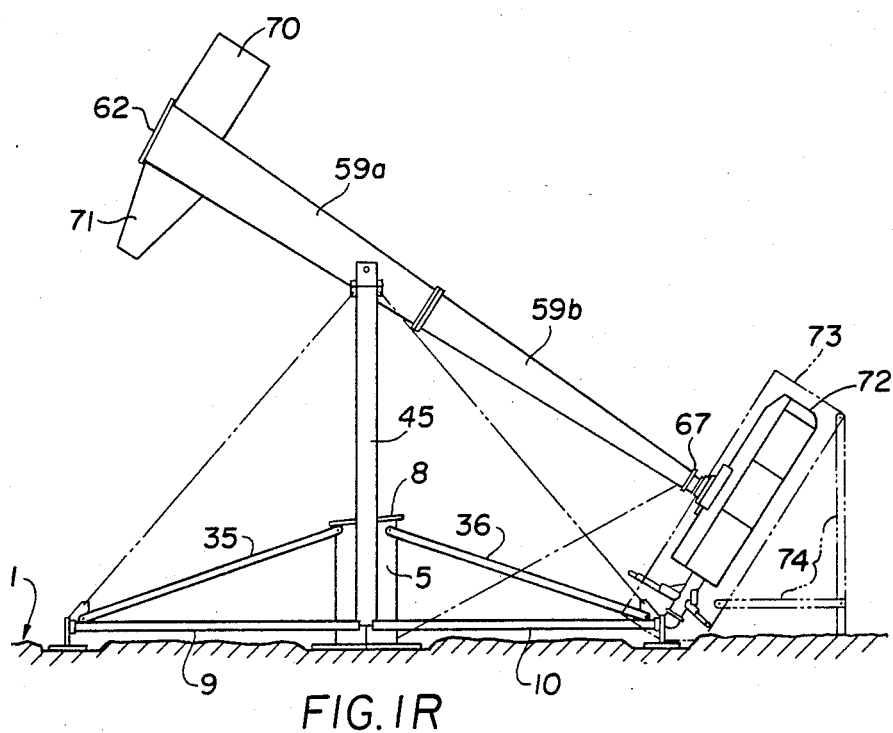

A wind turbine 72 or any desired equipment unit is then affixed to the tower member 59a, 59b at the top flange 67 thereof. This is accomplished by unbolting or otherwise uncoupling the bottom flange 62 of the tower member 59a, 59b and the flange 8 of the lower tower structural member 5. The winch 49 may then be used to rotate or pivotally move the tower member 59a, 59b about the pivot pin 69 in a clockwise direction until the top part 65 and the top flange 67 thereof are close to the support surface 1, as shown in FIG. 1R. The tower member 59a, 59b is secured in this position and the wind turbine or other equipment unit 72 is moved adjacent the top end 65 of said tower member while in its shipping crate 73 (FIG. 1Q).

In order to facilitate the mounting of the wind turbine 72 on the tower member 59a, 59b, the shipping crate 73 may be tilted, as shown in FIG. 1R, with the assistance of a crate support frame 74 (FIG. 1R). The wind turbine 72 is then bolted or otherwise suitably affixed to the tower member 59a, 59b via the top flange 67 thereof (FIG. 1R). The shipping crate 73 is removed and the tower member 59a 59b is rotated a few degrees counterclockwise to enable the installation of the blades 75 of the wind turbine 72, as shown in FIG. 6.

After the blades 75 are installed on the wind turbine 72, guy ropes are used to rotate the tower member 59a, 59b until it is coaxially aligned with the lower tower structural member 5 and said tower member and said lower tower structural member are coupled to each other via their flanges 62 and 8, respectively.

Once the blades 75 are installed, the structure of the invention and the wind turbine 72 are perfectly balanced at the pivot pin 69. Although the tower member 59a, 59b is normally upright, as shown in FIG. 2, the flanges 62 and 8 are uncoupled and said tower member is rotated clockwise to its position shown in FIG. 6 for maintenance and routine servicing such as, for example, oil check, oil change, lubrication, equipment inspection, and the like, and repair. Major repairs may be made when the tower member 59a, 59b is secured in the position shown in FIG. 1R.

Each of the upper and lower struts preferably comprises a pair of telescoping strut members and a fixing member for fixing the strut members of each strut at a desired position relative to each other thereby providing adjustability of the length of each of the struts. Thus, as shown in FIG. 5, which shows only the lower struts 9 and 10 and the upper struts 35 and 36, the lower strut 9 has an outer strut member 9a, an inner strut member 9b which telescopes therein and a fixing member or lock bolt 9c for fixing the strut members 9a and 9b at a desired position relative to each other. The lower strut 10 has an outer strut member 10a, an inner strut member 10b which telescopes therein and a fixing member or lock bolt 10c (FIG. 5) for fixing the strut members 10a and 10b at a desired position relative to each other. As shown in FIG. 5, the upper strut 35 has an outer strut member 35a, an inner strut member 35b which telescopes therein and a fixing member or lock bolt 35c for fixing the strut members 35a and 35b at a desired position relative to each other and the upper strut 36 has an outer strut member 36a, an inner strut member 36b which telescopes therein and a fixing member or lock bolt 36c for fixing the strut members 36a and 36b at a desired position relative to each other.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

I claim:

1. A method of erecting a portable, adjustable structure having a plurality of structural members for supporting equipment at a distance above a support surface, said method comprising the steps of placing initial ones of said structural members on said support surface;

manually winching and affixing additional ones of said structural members to said initial ones of said structural members, said ones of said structural members including structural members which are upright relative to said support surface;

stabilizing the structure on said support surface;

assembling an equipment support structural member from a lower equipment support structural member and an upper equipment support structural member coupled to said lower equipment support structural member;

manually winching and pivotally mounting said equipment support structural member on said additional ones of said structural members at said lower equipment support structural member, said equipment support structural member having spaced opposite first and second ends;

affixing ballast to said equipment support structural member at the second end thereof;

affixing said equipment to said equipment support structural member at the first end thereof;

manually winching and pivotally moving said equipment support structural member to a position substantially perpendicular to said support surface with said first end thereof spaced farther from said support surface than said second end thereof;

affixing said second end of said equipment support structural member to said initial ones of said structural members whereby said equipment support structural member is normally upright and is pivotable, upon unfastening of said second end from said additional ones of said structural members, to position said equipment close to said support surface for maintenance and repair.

2. A method as claimed in claim 1, wherein said ballast is affixed to said equipment support structural member by mounting ballast containers on opposite sides of said equipment support structural member at second end thereof and filling said ballast containers with ballast.

3. A portable, adjustable structure for supporting equipment at a distance above a support surface, said structure having a plurality of structural members and comprising initial ones of said structural members placed on said support surface said initial ones of said structural members including a lower tower structural member placed on said support surface, said lower tower structural member having a centerline substantially perpendicular to said support surface, an upper part and a flange at its upper part end, said flange being inclined to a plane perpendicular to said centerline;

manual winching means for affixing additional ones of said structural members to said initial ones of said structural members, said ones of said structural members including structural members which are upright relative to said support surface, said additional ones of said structural members including a pair of spaced substantially parallel pivot support structural members affixed to opposite sides of said lower tower structural member and extending substantially perpendicularly to said support surface;

stabilizing means for stabilizing the structure on said support surface;

an equipment support structural member pivotally mounted on said additional ones of said structural members, said equipment support structural member having spaced opposite first and second ends, said equipment being affixed to said equipment support structural member at the first end thereof, said equipment support structural member being pivotally movable to a position substantially perpendicular to said support surface with said first end thereof spaced farther from said support surface than said second end thereof;

ballast means affixed to said equipment support structural member at said second end thereof; and affixing means for affixing said second end of said equipment support structural member to said flange of said lower tower structural member of said initial ones of said structural members whereby said equipment support structural member is normally upright and is pivotable, upon unfastening of said affixing means, to position said equipment close to said support surface for maintenance and repair.

4. A structure as claimed in claim 3, wherein said equipment support structural member comprises a lower equipment support structural member and an upper equipment support structural member coupled to said lower equipment support structural member, and said equipment support structural member is pivotally mounted on said additional ones of said structural members at said lower equipment support structural member.

5. A structure as claimed in claim 3, wherein said ballast means comprises ballast containers mounted on opposite sides of said equipment support structural member at said second end thereof.

6. A structure as claimed in claim 4, wherein in said stabilizing means includes lower struts having spaced opposite first and second ends, the first ends of said lower struts being affixed to, and said lower struts extending substantially radially from, said lower tower structural member, a plurality of screw jacks, each mounted on the second end of a corresponding one of said lower struts and a plurality of foot pads, each affixed to a corresponding one of said jacks and placed on said support surface.

7. A structure as claimed in claim 6, wherein said lower tower structural member has a lower part spaced opposite said upper part, said lower struts are affixed to said lower tower structural member at said lower part, and said stabilizing means further includes upper struts having spaced opposite first and second ends, the first ends of said upper struts being affixed to, and said upper struts extending substantially radially from, the upper part of said lower tower structural member and the second end of each of said upper struts being affixed to corresponding ones of said lower struts.

8. A structure as claimed in claim 7, wherein said affixing means comprises a flange at the second end of said equipment support structural member, said flange and the flange at the upper part of said lower tower structural member having aligned holes formed therethrough for accommodating fastening components.

9. A structure as claimed in claim 7, wherein each of said lower and upper struts comprises a pair of telescoping strut members and bolt means for fixing said strut members at a desired position relative to each other thereby providing adjustability of the length of each of said struts.

10. A portable, adjustable structure for supporting a wind turbine at a distance above a support surface, said structure having a plurality of structural members and comprising a lower tower structural member placed on said support surface, said lower tower structural member having a centerline substantially perpendicular to said support surface, an upper part and a flange at its upper part end, said flange being inclined to a plane perpendicular to said centerline;

pivot support structural members affixed to said lower tower structural member in a manner whereby said pivot support structural members are upright relative to said support surface;

stabilizing means for stabilizing said lower tower structural member and said pivot support structural members on said support surface;

a tower member pivotally mounted on said pivot support structural members, said tower member having spaced opposite first and second ends, said wind turbine being affixed to said tower member at the first end thereof, said tower member being pivotally movable to a position substantially perpendicular to said support surface with said first end thereof spaced farther from said support surface than said second end thereof, said second end having a flange having an inclination matching that of the flange of said lower tower structural member, said flanges having aligned holes formed therethrough for accommodating coupling components;

ballast means affixed to said tower member at said second end thereof; and coupling means for coupling said flange of said second end of said tower member to said flange of said lower tower structural member whereby said tower member is normally upright and is pivotable, upon uncoupling of said coupling means, to position said wind turbine close to said support surface for maintenance and repair.

11. A structure as claimed in claim 10, wherein said tower member comprises a lower tower section and an upper tower section coupled to said lower tower section, and said tower member is pivotally mounted on said pivot support structural members at said lower tower section.

12. A structure as claimed in claim 10, wherein said ballast means comprises ballast containers mounted on opposite sides of said tower member at said second end thereof.

13. A structure as claimed in claim 10, wherein said pivot support structural members are in spaced substantially parallel relation and are affixed to opposite sides of said lower tower structural member and extend substantially perpendicularly to said support surface.

14. A structure as claimed in claim 10, wherein said stabilizing means includes lower struts having spaced opposite first and second ends, the first ends of said lower struts being affixed to, and said lower struts extending substantially radially from, said lower tower structural member, a plurality of screw jacks, each mounted on the second end of a corresponding one of said lower struts and a plurality of foot pads, each affixed to a corresponding one of said jacks and placed on said support surface.

15. A structure as claimed in claim 11, wherein said lower tower structural member has a lower part and a spaced opposite upper part, said lower struts are affixed to said lower tower structural member at said lower part, and said stabilizing means further includes upper struts having spaced opposite first and second ends, the first ends of said upper struts being affixed to, and said upper struts extending substantially radially from, the upper part of said lower tower structural member and the second end of each of said upper struts being affixed to corresponding ones of said lower struts.

16. A structure as claimed in claim 15, wherein each of said lower and upper struts comprises a pair of telescoping strut members and bolt means for fixing said strut members at a desired position relative to each other thereby providing adjustability of the length of each of said struts.

* * * * *